United States Patent [19]
DuBois

[11] Patent Number: 5,218,053
[45] Date of Patent: Jun. 8, 1993

[54] POLYMERS HAVING STABLE ANHYDRIDE RINGS

[75] Inventor: Donn A. DuBois, Houston, Tex.

[73] Assignee: Shell Oil Company, Houston, Tex.

[21] Appl. No.: 880,280

[22] Filed: May 8, 1992

[51] Int. Cl.$^5$ .......................................... C08F 267/04
[52] U.S. Cl. ................................. 525/285; 525/271;
525/299; 525/301; 525/309; 525/330.3
[58] Field of Search .............. 525/299, 301, 309, 285, 525/271, 330.3

[56] References Cited
U.S. PATENT DOCUMENTS 3,948,846  4/1976  Waters ................................. 525/299
5,098,959  3/1992  McGrath et al. .................... 525/301

FOREIGN PATENT DOCUMENTS

WO87/04810  8/1987  World Int. Prop. O. .......... 525/294

*Primary Examiner*—Jacob Ziegler

[57] ABSTRACT

Polymers comprising anionically polymerized monomers such as butadiene or styrene and adjacent units of (1-methyl-1-alkyl)alkyl esters such as t-butylmethacrylate, as well as selectively hydrogenated derivatives thereof, are heated to at least 180° C. to convert the adjacent ester units to stable anhydride rings.

20 Claims, No Drawings

POLYMERS HAVING STABLE ANHYDRIDE RINGS

FIELD OF THE INVENTION

This invention relates to polymers having polar groups. More particularly, the invention relates to polymers having anhydride groups.

BACKGROUND OF THE INVENTION

A method of modifying selected properties of polymers is to provide polarity or functionality within the polymer as by introducing maleic anhydride groups as described in U.S. Pat. Nos. 4,427,828, 4,578,429, and 4,927,889. The anhydride groups have five-membered ring structures and readily undergo hydrolysis to acid groups when contacted with water. Careful packaging and handling of the polymers is required to exclude moisture that converts the anhydride groups to acid groups. Anhydride groups are preferred over acid groups because the anhydride groups are easier to melt process and do not release water during processing.

Published European Patent Application 298,667 describes the polymerization of elastomers having blocks of alkyl esters and further describes conversion of the alkyl ester groups to acid groups. The acid groups release water during processing which limits the utility of the polymers in molding process.

International Publication No. WO 87/04810 describes homopolymers of t-butylmethacrylate which are thermally converted to polymers of methacrylic anhydride and then irradiated to form an image with a positive resist.

SUMMARY OF THE INVENTION

The present invention provides polymers that have stable anhydride rings which do not readily hydrolyze to acid groups during normal handling. The anhydride rings are prepared by thermally decomposing adjacent units of (1-methyl-1-alkyl)alkyl esters such as t-butylmethacrylate. A wide variety of polymers are readily prepared with the stable anhydride rings in the polymer backbone. Thus, special handling of conventional polymers having less table anhydride rings is minimized.

DESCRIPTION OF THE INVENTION

The novel polymers of the invention are produced from base polymers, or selectively hydrogenated derivatives thereof, comprising either a polymerized conjugated alkadiene or a polymerized alkenyl aromatic compound and adjacent units of a polymerized (1-methyl-1-alkyl)alkyl ester that thermally converts to stable anhydride rings.

The base polymers of the invention are exemplified by the following structures:

| | |
|---|---|
| A—M | (I) |
| B—M | (II) |
| B—M—B | (III) |
| M—B—M | (IV) |
| (B—M—)$_y$—X | (V) |
| (M—B—)$_y$—Z | (VI) |
| A—B—M | (VII) |
| B—A—M | (VIII) |
| A—B—A—M | (IX) |
| M—A—B—A—M | (X) |
| (A—B—M—)$_y$—X | (XI) |
| (M—A—B—)$_y$—Z | (XII) |
| (M—B—A—)$_y$—Z | (XIII) | wherein each A is a block or segment comprising predominantly a polymerized alkenyl aromatic compound, each B is a block or segment comprising predominantly a polymerized conjugated alkadiene, each M is a segment or block comprising at least two adjacent units of a polymerized (1-methyl-1-alkyl)alkyl ester, y is an integer representing multiple arms in a star configuration, X is the residue of a polyfunctional coupling agent, and Z is a crosslinked core of a polyfunctional coupling agent or a polyfunctional polymerization initiator.

The alkenyl aromatic compound employed as each A block or segment in some of the above structures is a hydrocarbon compound of up to 18 carbon atoms having an alkenyl group of up to 6 carbon atoms attached to a ring carbon atom of an aromatic ring system of up to 2 aromatic rings. Such alkenyl aromatic compounds are illustrated by styrene, 2-butenylnaphthalene, 4-t-butoxystyrene, 3-isopropenylbiphenyl, and isopropenylnapthalene. The preferred alkenyl aromatic compounds have an alkenyl group of up to 3 carbon atoms attached to a benzene ring as exemplified by styrene and styrene homologs such as styrene, α-methylstyrene, p-methylstyrene, and α,4-dimethylstyrene. Styrene and α-methylstyrene are particularly preferred alkenyl aromatic compounds, especially styrene.

Each A block or segment of the polymers is preferably at least 80% by weight polymerized alkenyl aromatic compound and is most preferably homopolymeric.

Each B block or segment in the structures of Formula II-XII preferably comprises at least 90% by weight of the polymerized conjugated alkadiene. Most preferably, the B segments or blocks are homopolymeric. The conjugated alkadienes preferably have up to 8 carbon atoms. Illustrative of such conjugated alkadienes are 1,3-butadiene (butadiene), 2-methyl-1,3-butadiene (isoprene), 1,3-pentadiene (piperylene), 1,3-octadiene, and 2-methyl-1,3-pentadiene. Preferred conjugated alkadienes are butadiene and isoprene, particularly butadiene. Within the preferred polyalkadiene blocks or segments of the polymers of Formula II-XII, the percentage of units produced by 1,4 polymerization is at least about 5% and preferably at least about 20%.

Each M is preferably a methacrylate block or segment comprising at least two adjacent units of a polymerized (1-methyl-1-alkyl)alkyl methacrylate. Homopolymeric M segments or blocks of (1-methyl-1-alkyl)alkyl methacrylates are most preferred.

The alkyl esters have the following structure:

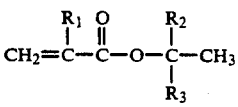

(A)

wherein R₁ is hydrogen or an alkyl or aromatic group comprising from 1 to 10 carbon atoms, R₂ is an alkyl group comprising from 1 to 10 carbon atoms, and R₃ is an alkyl group comprising from 1 to 10 carbon atoms.

The preferred methacrylates have the structure:

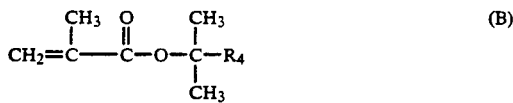

wherein R₄ is an alkyl group comprising from 1 to 10 carbon atoms, most preferably methyl. The most preferred alkyl esters have methyl for R₂ and R₃ since both R₂ and R₃ are removed from the polymer upon conversion of adjacent ester groups to an anhydride ring and selection of methyl groups results in a volatile by-product that is easily removed from the polymer.

Adjacent (1-methyl-1-alkyl)alkyl ester groups thermally convert to stable anhydride rings having six members after reaction as follows for the esters of Formula B:

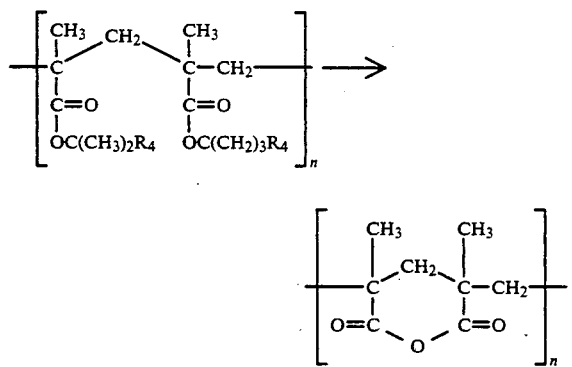

wherein R₄ is as defined above and n represents the number of adjacent alkyl ester units that convert to stable anhydride rings.

Examples of the (1-methyl-1-alkyl) alkyl esters of Formula A include:
1,1-dimethylethylacrylate (t-butylacrylate),
1,1-dimethylpropylacrylate (t-pentylacrylate),
1,1-dimethylethyl-α-propylacrylate,
1-methyl-1-ethylpropyl-α-butylacrylate,
1,1-dimethylbutyl-α-phenylacrylate,
1,1-dimethylpropyl-α-phenylacrylate (t-pentylatropate),
1,1-dimethylethyl-α-methylacrylate, (t-butylmethylacrylate), and
1,1-dimethylpropyl-α-methylacrylate (t-pentylmethacrylate).

The preferred methacrylates of Formula B include:
1,1-dimethylethyl-α-methylacrylate, (t-butylmethylacrylate, and
1,1-dimethylpropyl-α-methylacrylate (t-pentylmetharylate).

The most preferred alkyl ester is t-butylmethacrylate which is commercially available in high purity from Mitsubishi-Rayon, Japan. Less pure t-butylmethacrylate is available from Monomer, Polymer and Dajac and can be used if passed through a column of alumina and 13X zeolite to remove methacrylic acid and t-butylalcohol. The preferred zeolites have a cavity size no less than 10 angstroms such as Zeolite 13X which has the formula $Na_{86}(AlO_2)_{86}(SiO_2)_{106} \cdot 267H_2O$.

Mixtures of the alkyl esters of Formula A and other esters, which do not thermally convert to anhydride groups, preferably isobutylmethylacrylate (3-methylpropyl-α-methylacrylate), can be used if M blocks having both ester and anhydride functional groups are desired. Alternatively, the anhydride reaction temperature and residence time can be reduced to afford a mixed block of unreacted ester and six-membered anhydride.

The processes for producing the polymers of Formula I–XIII are, at least in part, rather particular because of the tendency of the ester groups to undergo side reactions with polymer lithium species. In the process of producing a more conventional polymer, e.g., a block polymer of styrene and 1,3-butadiene, a variety of process schemes are available. Such procedures include the production by anionic polymerization of a living polymer of either type of monomer before crossing over to the polymerization of the other type of monomer. It is also conventional to produce such block polymers by sequential polymerization or by the use of coupling agents to obtain branched or radial polymers. In the production of the polymers of the invention, the aliphatic and aromatic portions are produced by sequential polymerization and the ester block is then produced as a final polymerization step prior to termination or any addition of coupling agents.

In each procedure to form a polymer of Formula I, II, III, V, VII, VIII, IX, or XI, the monomers are anionically polymerized in the presence of a metal alkyl initiator, preferably an alkali metal alkyl. The use of such initiators in anionic polymerizations is well known and conventional. A particularly preferred initiator is sec-butyllithium.

The polymerization of the alkenyl aromatic compounds takes place in a non-polar hydrocarbon solvent such as cyclohexane or in mixed polar/non-polar solvents, e.g., mixtures of cyclohexane and an ether such as tetrahydrofuran or diethyl ether. Suitable reaction temperatures are from about 20° C. to about 80° C. and the reaction pressure is sufficient to maintain the mixture in the liquid phase. The resulting product includes a living poly(alkenyl aromatic compound) block having a terminal organometallic site which is used for further polymerization.

The polymerization of the conjugated alkadiene takes place in a solvent selected to control the mode of polymerization. When the reaction solvent is non-polar, the desired degree of 1,4 polymerization takes place whereas the presence of polar material in a mixed solvent results in an increased proportion of 1,2 polymerization. Polymers resulting from about 6% to about 95% of 1,2 polymerization are of particular interest. In the case of 1,4 polymerization, the presence of ethylenic unsaturation in the polymeric chain results in cis and trans configurations. Polymerization to give a cis configuration is predominant.

Polymerization of the esters takes place in the mixed solvent containing the polymerized conjugated alkadiene at a temperature from about −80° C. to about 100° C., preferably from about 10° C. to about 50° C.

Subsequent to production of the acrylic block or segment, the polymerization is terminated by either reaction with a protic material, typically an alkanol such as methanol or ethanol (Formula I, II, V, VIII, and IX), or with a coupling agent, typically dibromoethane or divinylbenzene (Formula III, V, and XI). Coupling with a polymerizable monomer such as divinylbenzene does not terminate the polymerization reaction. Termination to remove the lithium is preferred after coupling with divinylbenzene although additional arms can be grown from the lithium sites before termination if desired. The polymers are then recovered by well known procedures such as precipitation or solvent removal.

The polymers produced by the above procedures will undergo some coupling through an ester group on an adjacent living molecule prior to termination unless the living polymer chains are first end-capped with a unit of 1,1-diphenylethylene or α-methylstyrene. Ester coupling occurs in about 10–50% of the polymer by weight if left unchecked. Such coupling is often acceptable, particularly when the desired polymer structure requires coupling after polymerization of the esters. (Formula III, V, and XI).

The production of the polymers of Formula IV and X is somewhat different procedurally, although the process technology is broadly old. In this modification, conjugated alkadiene is polymerized in the presence of a difunctional initiator, e.g., 1,3-bis(1-lithio-1,3-dimethylpentyl)benzene, to produce a living polyalkadiene species with two reactive organometallic sites. This polymer species is then reacted with the remaining monomers to produce the indicated structures.

The production of the polymers of Formula VI, XII, and XIII is also different procedurally, although the process technology again is broadly old. In this modification, a multifunctional initiator identified as core Z is first produced by anionically polymerizing small molecules of living polystyrene or a living conjugated alkadiene and coupling the small molecules with vivinylbenzene to provide numerous organometallic sites for further polymerization.

Each B segment or block has a molecular weight from 2,000 to 500,000 prior to any coupling, preferably from 2,000 to 200,000. Each A block has a molecular weight from 500 to 30,000 prior to any coupling, preferably from 1,000 to 20,000. Each non-coupled M segment or block has a molecular weight from 200 to 100,000, preferably from 200 to 30,000, prior to conversion to an anhydride.

In a further modification of the base polymers of Formula II–XIII used in the invention, the base polymers are selectively hydrogenated to reduce the extent of unsaturation in the aliphatic portion of the polymer without substantially reducing the aromatic carbon-carbon unsaturation of any aromatic portion of the block copolymer. However, in some cases hydrogenation of the aromatic ring is desired. Thus, a less selective catalyst will work.

A number of catalysts, particularly transition metal catalysts, are capable of selectively hydrogenating the aliphatic unsaturation of a copolymer of an alkenyl aromatic compound and a conjugated alkadiene, but the presence of the M segment or block can make the selective hydrogenation more difficult. To selectively hydrogenate the aliphatic unsaturation it is preferred to employ a "homogeneous" catalyst formed from a soluble nickel compound and a trialkylaluminum. Nickel naphthenate or nickel octoate is a preferred nickel salt. Although this catalyst system is one of the catalysts conventionally employed for selective hydrogenation absent alkyl methacrylate blocks, other "conventional" catalysts are not suitable for selective hydrogenation of the conjugated alkadienes in the ester containing polymers.

In the selective hydrogenation process, the base polymer is reacted in situ, or if isolated is dissolved in a suitable solvent such as cyclohexane or a cyclohexane-ether mixture and the resulting solution is contacted with hydrogen gas in the presence of the homogeneous nickel catalyst. Hydrogenation takes place at temperatures from about 25° C. to about 150° C. and hydrogen pressures from about 15 psig to about 1000 psig. Hydrogenation is considered to be complete when at least about 90%, preferably at least 98%, of the carbon-carbon unsaturation of the aliphatic portion of the base polymer has been saturated, as can be determined by nuclear magnetic resonance spectroscopy. Under the conditions of the selective hydrogenation no more than about 5% and preferably even fewer of the units of the A blocks will have undergone reaction with the hydrogen. The selectively hydrogenated block polymer is recovered by conventional procedures such as washing with aqueous acid to remove catalyst residues and removal of the solvent and other volatiles by evaporation or distillation.

The anhydride groups in the polymers of the invention are produced by heating the base polymers to a temperature in excess of 180° C., preferably 220° C. to 260° C. Heating is preferably conducted in an extruder having a devolatization section to remove the volatile by-products formed by combination of two adjacent ester groups to make one anhydride group.

The polymers preferably have the following number average molecular weights after conversion to anhydride as measured by gel permeation chromatography:

| Formula | Preferred Range | | Most Preferred | |
| --- | --- | --- | --- | --- |
| | Min. $MW_n$ | Max. $MW_n$ | Min. $MW_n$ | Max. $MW_n$ |
| I | 1,000 | 500,000 | 1,000 | 100,000 |
| II | 1,000 | 1,000,000 | 1,000 | 500,000 |
| III | 1,000 | 2,000,000 | 1,000 | 500,000 |
| IV | 1,000 | 2,000,000 | 1,000 | 500,000 |
| V | 1,000 | 2,000,000 | 1,000 | 1,000,000 |
| VI | 1,000 | 2,000,000 | 1,000 | 500,000 |
| VII | 1,000 | 2,000,000 | 20,000 | 1,000,000 |
| VIII | 1,000 | 2,000,000 | 20,000 | 2,000,000 |
| IX | 1,000 | 2,000,000 | 35,000 | 2,000,000 |
| X | 1,000 | 2,000,000 | 1,000 | 650,000 |
| XI | 1,000 | 2,000,000 | 1,000 | 1,000,000 |
| XII | 1,000 | 2,000,000 | 1,000 | 1,000,000 |
| XIII | 1,000 | 2,000,000 | 1,000 | 1,000,000 |

Both absolute and number average molecular weights are determined by conventional GPC as described in the examples below.

The polymers of the invention, like the base copolymers, contain polar groups and have utilities conventional for such polymers. The polar polymers are particularly useful in blends with engineering thermoplastics, asphalt compositions, adhesive formulations, including laminating adhesives for flexible packaging, sealants, fibers, and coatings formulations, especially coatings based on water emulsions. Examples of useful products include adhesives for tapes, labels, decals, and mastics. The polymers of the invention demonstrate significantly improved resistance to atmospheric hydrolysis in comparison to maleic anhydride modified polymers which have some of the same utilities.

The invention is further illustrated by the following illustrative embodiments which should not be constructed as limiting.

EXAMPLE 1

Poly(styrene)-Poly(t-butylmethacrylate)

This example is illustrative of a bench-scale synthesis, however the reaction conditions (i.e. solvents, temperatures and reaction times) are very similar to procedures used for pilot plant runs.

A 2 liter glass reactor was charged with 1092 grams of anhydrous cyclohexane, 70 grams of anhydrous diethyl ether and 100 grams of styrene monomer that had been purified over alumina. The reaction mixture was heated to 45° C. and then pretitrated with s-BuLi to remove protic impurities. In this particular run, 0.4 ml of 1.44M s-BuLi was required to titrate the reaction mixture. The theoretical charge of s-BuLi, 9.0 ml, was then added to initiate the polymerization of the styrene block. The styrene was allowed to react for 30 minutes. The reaction mixture was cooled down to 25° C., and 98.6 grams of TBMA (purified by passing the monomer over 13X molecular sieves, then alumina) was added slowly to the living polystyryllithium solution. The TBMA polymerization was allowed to continue for 15 minutes at which point the reaction was terminated with methanol. The polymer was precipitated in methanol, and then dried to a constant weight in a vacuum oven.

The composition of the block copolymer was determined by proton NMR spectroscopy to be 42 mol. % block-P(TBMA) and 58 mol. % block-poly(styrene). This was in agreement with the theoretical composition of 42 mol. % of P(TBMA) and 58 mol. % styrene. GPC analysis revealed that approximately 26% of the poly(styrene) blocks were coupled by the ester instead of growing a linear ester block. The main peak of the bimodal molecular weight distribution had a peak molecular weight of 33,000 g/mol based on poly(styrene) calibration. GPC in conjunction with an infrared detector set at 1724 cm$^{-1}$ revealed that this main peak contained the majority of TBMA units, however, the coupled peak also contained what was estimated to be approximately 1-2 wt. % TMBA. The products formed in the polymerization appear to be:
linear diblock: S-TBMA, this is the major product
coupled product: S-(short block TBMA)-S
The coupling side reaction can be greatly retarded by adding an end-cap agent like diphenyl ethylene, which is well known in methacrylate polymerization technology. This is demonstrated in the following example, Example 2.

EXAMPLE 2

Synthesis of Poly(1,3-butadiene)-P(TBMA)

Using the same basic experimental procedure described in Example 1, 1,3-butadiene was used in place of styrene as the first block. The reagents used are as follows:
Cyclohexane, 1500 ml
Diethylether, 70 g
1,3-butadiene, 96 g
s-BuLi (1.44 M), 6.67 ml
1,1-Diphenyl Ethylene, 1.76 ml
TBMA, 19 g
The BD block was allowed to polymerize for 45 min at 45° C. DPE was added, and the reaction was allowed to stir for 90 min. The resulting DPE-capped polymer was dark red. The TBMA was added, and polymerization was allowed to proceed for 15 minutes, then terminated with methanol.

GPC analysis showed a single peak with a peak molecular weight of approximately 16,000 g/mol. NMR confirmed the composition.

EXAMPLE 3

Thermolysis of P(TBMA) to Form Anhydride

The thermolysis conversion of ester to anhydride can be carried out in a variety of ways. For example, typical polymer processing devices like extruders, injection molders or Braebender-like melt mixers work provided the temperature is over approximately 180° C., and a sufficient residence time is used. In addition, the methacrylate-containing block copolymer could be mixed in a commercial formulation, then heated and converted to anhydride during normal use for that formulation. Examples of this would be hot-melt adhesive formulations or blends of polymer in bitumen.

For this particular example we used a Minimax TM melt mixer. The polymer is fed into the barrel that is held at 230° C. The molten polymer resides approximately 15 seconds in the barrel prior to extrusion. In this example, 15 g of P(TBMA) (Mn=20,000 g/mol) required three passes through this device to fully convert the polymer to the anhydride form. Disappearance of the ester carbonyl absorption at 1724 cm$^{-1}$ and concomitant appearance of two anhydride absorptions at 1802.1 cm$^{-1}$ and 1760.8 cm$^{-1}$, are indicative of substantially complete conversion. $^{13}$C NMR revealed that the conversion was 94% based on the TBMA backbone Me group and t-butyl Me group ratios.

EXAMPLE 4

Preparation of a Block Terpolymer

The entire anionic polymerization was carried out in a three gallon autoclave reactor, under inert atmosphere conditions. Cyclohexane, diethyl ether, styrene and 1,3-butadiene were purified by elution through columns packed with alumina and molecular sieves. The copolymerization was carried out in four steps. For the first step, 5.88 lbs of cyclohexane, 0.28 lb of styrene monomer and 2.05 lb of diethylether were charged in the reactor and subsequently titrated with sec-butyllithium until a small exotherm was observed, after which the full charge of initiator was added. The total charge of sec-butyllithium used to initiate polymerization was 317.0 ppm. The initiation temperature was 25.2° C. The step one reaction was allowed to proceed for 30 minutes. For step two, 1.42 lb of 1,3 butadiene monomer was added to the living polymer solution and allowed to polymerize for approximately 40 minutes at 25.0° C. For step three, 0.28 lbs of styrene was again added and polymerized for 30 minutes. The last step was the addition of 0.41 lbs tertiary butyl methacrylate monomer which was fully polymerized in less than one minute at 25.0° C. Analysis of the polymer was accomplished by means of GPC and carbon NMR spectroscopy. GPC analysis revealed a bimodal distribution, with a main peak at 83,000 g/mol, and a second smaller peak at 156,000 g/mol. The peak areas were respectively, 71% and 29%. The first peak at 86,000 peak molecular weight was elucidated to be S-B-S-TBMA, the second peak is a coupled product, S-B-S-TBMA-S-B-S. It is most probable that the coupling is occurring by a side reaction of polymer-lithium with the TBMA carbonyl group.

A supplementary analysis by GPC combined with an infrared detector set at 1724 cm$^{-1}$, revealed that the first GPC peak contains the majority of the TBMA, however, a weaker signal was also observed for the coupled product indicating it also contains TBMA units. GPC revealed a molecular weight (based on polystyrene as reference) of 125,000 g/mol. $^{-}$C NMR results gave a composition of 16 mol. % styrene, 36 mol. % 1,2-addition butadiene, 40 mol. % 1,4-addition butadiene and 8 mol. % methacrylate. The bulk polymer solution was used directly for the hydrogenation reaction described in Example 5.

EXAMPLE 5

Hydrogenation of the Block Terpolymer

The block terpolymer solution of Example 4 was hydrogenated using a catalyst composed of nickel octoate reduced by triethyl aluminum. The ratio of nickel to aluminum for this particular example was 1:2.3. The total catalyst charge of 105 ppm (based on nickel) was divided into three portions; first 25% of the total, second 25% of the total, and third 50% of the total. The temperature of the polymer solution was slowly increased with the catalyst charge being added first at 35° C., second at 55° C., and third at 90° C. The conversion as determined by NMR spectroscopy is given in Table 1. The residual unsaturation was estimated to be 0.25 meq double bonds per gram polymer.

TABLE 1

| Time-Conversion Data for Example 5. | |
|---|---|
| Conversion (%) | Elapsed Time (minutes) |
| 81.5 | 15 |
| 95.9 | 50 |
| 96.8 | 85 |
| 97.3 | 120 |
| 97.4 | 150 |

EXAMPLE 6

Thermolysis of Ester in the Block Terpolymer

Using the same procedures described in Example 3, 15 g of the block terpolymer Styrene-Hydrogenated Butadiene-Styrene-TBMA (block molecular weights of 7,000-36,000-7,000-5,000) was melt mixed in three passes at 250° C. Here again, the ester was fully converted to the anhydride form.

EXAMPLE 7

S-EP-tBMA Polymer

A 15.2% solution of treated styrene in cyclohexane was prepared by charging 676.1 grams of styrene monomer into 3780.5 grams of cyclohexane. The reactor was brought to 30° C. and the contents titrated with s-BuLi initiator (to scavenge the residual polar poisons) to a temperature end point (8 mls of solution was required). Then 0.625 gmoles of s-BuLi was charged to initiate styrene polymerizations to a theoretical peak molecular weight of 10,800. A peak molecular weight of 11,070 was achieved. The bulk of styrene polymerization was conducted at 50° C. for a calculated 8 styrene half-lives. The reactor temperature control set point was then adjusted to 30° C., and the solution allowed to cool.

A 13.7% solution of treated isoprene in cyclohexane was prepared by charging 568.9 grams of isoprene into 3573.4 grams of cyclohexane in a second reactor. The reactor was brought to 30° C. and the contents titrated with s-BuLi initiator to a temperature end point (8 mls of solution was required.) Then 296.0 grams of the polystyryl lithium solution in the first reactor was transferred to the second reactor to initiate the growth of isoprene and make the appropriate S-I diblock. The bulk of the isoprene reaction was conducted at 55° C. for a calculated 8 isoprene half lives. The reactor was then cooled to 30° C. Then 61.7 grams of treated tBMA monomer was charged rapidly to the polystyrene-polyisoprenyl lithium solution. This occurred at a calculated isoprene reaction half-life of 11 or a 99.9% conversion of isoprene to polyisoprene. The tBMA polymerization reaction was allowed to proceed for 10 minutes at 30° C. before termination.

The entire contents of the second reactor, 4080 grams of polymer solution, was moved over the Hydrogenator. Then 1400 grams of cyclohexane was added to reduce the polymer solids from 15.0% to 11.2%. The reactor temperature was adjusted to 45° C. and the reactor pressure was recharged to 750 psig with Hydrogen. A total of 1.09 grams of Nickel was charged to the polymer solution to accomplish hydrogenation of the unsaturated bonds. The hydrogenation was conducted at 80° C. and 800 to 850 psig hydrogen pressure. After three hours of incubation at 80° C., an residual unsaturation of 0.21 meq/gr was achieved. The reaction was run for another hour at 80° C. and then shut down. A final residual unsaturation by ozone titration of 0.13 meq/gr was achieved.

Nickel was oxidized and removed by reacting it with oxygen in the presence of 1% phosphoric acid in a mildly agitated vessel. A mixer speed of 70 rpm was used for the first 2 washes and 180 rpm for the last 2. Four acid wash cycles were conducted for 60 minutes. The cement was neutralized with aqueous ammonium hydroxide before the addition of antioxidant. The finished polymer was recovered from solvent by hot water coagulation. The polymer had the following composition prior to thermal conversion of the ester groups to anhydride groups at 250° C. for 25 seconds in an extruder.

Analytical Data for Example 7 (S-I-TBMA)

$^1$H NMR:
WT % STYRENE=7.06,
WT % ISOPRENE (1,2)=0.49,
WT % ISOPRENE (3,4)=4.81,
WT % ISOPRENE (1,4)=75.55,
WT % TBMA=7.9,
WT % IRGANOX 1010 (ANTIOXIDANT)=3.9,
WT % RESIDUAL SOLVENT=0.29,
$^1$H NMR FOR HYDROGENATED S-I-TBMA:
% CONVERSION=99.9%,
RESIDUAL UNSATURATION=0.02 Meq/g.
BIMODAL DISTRIBUTION, 30.8% COUPLED S-I-(tbma)-I-S.
Mw/Mn FOR MAIN PEAK=1.47, PEAK MW (RELATIVE TO POLYSTYRENE)=417,840 G.MOL.

EXAMPLE 8

Low MW, Telechelic TBMA-EB-TBMA

A difunctional initiator was prepared in a glass polymerization bottle by combining 2.43 g of diisopropenyl benzene (DIPB), 15 g of cyclohexane, and 0.02 g of diethylglyme. This solution was heated to approximately 50° C. The DIPB solution was first titrated with s-BuLi until a faint green color persisted, and then the full charge of 15.85 g of s-BuLi was added. This reaction was allowed to proceed for 60 minutes. The deep red dilithio compound was cooled to room temperature and loaded into a small pressure vessel.

A 2 liter glass reactor was first charged with 1153 g of cyclohexane and 70.2 g of diethylether. Then 60 g of 1,3-butadiene was charged from a pressure vessel and titrated with 12% s-BuLi until an exotherm of 0.5° C. was observed. The monomer solution was heated to 45° C., and the difunctional initiator was added to begin the polymerization. The polymerization was allowed to proceed for 45 min. and then 10.82 g of 1,1-diphenylethylene was added to the living chain ends prior to the alkyl ester addition. The end-capping reaction was allowed to proceed for 90 minutes while the polymerization cement was slowly cooling to approximately 30° C. At this point 6.0 g of t-butylmethacrylate was added which resulted in a rapid color change from red to faint yellow. The reaction proceeded for 15 minutes before termination with excess methanol. Hydrogenation, catalyst extraction and product isolation were carried out as described in the preceding examples.

What is claimed is:

1. A process for making a polymer, comprising the steps of:
   anionically polymerizing a conjugated alkadiene or an alkenyl aromatic compound to form living polymer molecules;
   anionically polymerizing a (1-methyl-1-alkyl)alkyl ester to form adjacent units of the ester on the living polymer molecules;
   recovering the polymer molecules; and
   heating the polymer molecules to convert adjacent ester groups to anhydride rings.

2. The process of claim 1, wherein the living polymer molecules comprise 1,3-butadiene or isoprene and the (1-methyl-1-alkyl)alkyl ester is t-butylmethacrylate or t-butylacrylate.

3. The process of claim 2, wherein the living polymer molecules comprise 1,3-butadiene and the (1-methyl-1-alkyl)alkyl ester is t-butylmethacrylate.

4. The process of claim 2, further comprising the step of hydrogenating aliphatic unsaturation in the polymer molecules prior to heating the polymer to form anhydride rings.

5. The process of claim 1, wherein the polymer molecules are heated to at least 180° C. for a sufficient time to achieve substantially complete conversion of the ester groups to anhydride groups.

6. The process of claim 5, wherein the polymer molecules are heated while passing through an extruder having a devolatilizing section.

7. A polymer molecule comprising polymerized units of a conjugated alkadiene or an alkenyl aromatic compound and six membered anhydride rings.

8. The molecule of claim 7, wherein the anhydride rings have the structure:

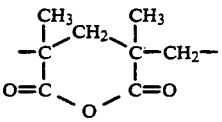

and the polymer molecule comprises 1,3-butadiene or isoprene.

9. The molecule of claim 8, further comprising hydrogenation of the 1,3-butadiene or isoprene.

10. The molecule of claim 9, further comprising polymerized styrene units.

11. The molecule of claim 10, consisting of the block structure styrene-hydrogenated butadiene-styrene-anhydride rings.

12. The molecule of claim 11, wherein each block is substantially homopolymeric.

13. A block copolymer, comprising blocks of a polymerized conjugated alkadiene or a polymerized alkenyl aromatic compound and blocks comprising at least one six membered anhydride ring.

14. The block polymer of claim 13, comprising:
blocks of a polymerized conjugated alkadiene, and
blocks comprising at least one anhydride ring having the structure:

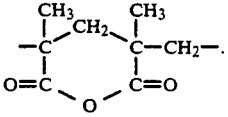

15. The block polymer of claim 14, wherein the conjugated alkadiene is 1,3-butadiene or isoprene.

16. The block polymer of claim 15, wherein the conjugated alkadiene is 1,3-butadiene.

17. The block polymer of claim 16, wherein each block is homopolymeric.

18. The block polymer of claim 17, further comprising selective hydrogenation of the block of the 1,3-butadiene.

19. The block polymer of claim 18, further comprising a number average molecular weight from 1,000 to 2,000,000.

20. The block polymer of claim 19, wherein the block copolymer has the structure styrene-hydrogenated butadiene-styrene-anhydride rings and from 10% to 50% by weight of the block copolymer is coupled.

* * * * *